United States Patent
Michalopoulos et al.

(10) Patent No.: US 12,058,764 B2
(45) Date of Patent: Aug. 6, 2024

(54) POSITIONING REFERENCE UNIT SELECTION

(71) Applicant: Nokia Solutions and Networks Oy, Espoo (FI)

(72) Inventors: Diomidis Michalopoulos, Munich (DE); Stepan Kucera, Munich (DE); Taylan Sahin, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/475,377

(22) Filed: Sep. 27, 2023

(65) Prior Publication Data
US 2024/0107620 A1    Mar. 28, 2024

(30) Foreign Application Priority Data
Sep. 27, 2022    (FI) .................................... 20225838

(51) Int. Cl.
*H04W 76/27*        (2018.01)
*H04W 72/25*        (2023.01)

(52) U.S. Cl.
CPC ........... *H04W 76/27* (2018.02); *H04W 72/25* (2023.01)

(58) Field of Classification Search
CPC . G01S 19/42; H04W 4/02–029; H04W 52/02; H04W 64/00–006; H04W 72/20; H04W 72/25; H04W 76/10; H04W 76/27
See application file for complete search history.

(56) References Cited

U.S. PATENT DOCUMENTS

| | | | |
|---|---|---|---|
| 10,506,543 B1 | 12/2019 | Edge et al. | |
| 10,869,315 B2* | 12/2020 | Cheng | H04W 4/40 |
| 11,119,182 B2 | 9/2021 | Lindoff et al. | |
| 11,706,790 B2 | 7/2023 | Taherzadeh Boroujeni et al. | |
| 2005/0020279 A1 | 1/2005 | Markhovsky et al. | |

(Continued)

FOREIGN PATENT DOCUMENTS

| | | |
|---|---|---|
| CN | 113330786 A | 8/2021 |
| EP | 1901260 A1 | 3/2008 |

(Continued)

OTHER PUBLICATIONS

"Running 38.305 CR for Positioning WI on RAT dependent positioning methods", 3GPP TSG-RAN2 Meeting #116-e, R2-2111636, Intel Corporation, Nov. 1-11, 2021, 19 pages.

(Continued)

*Primary Examiner* — Thomas R Cairns
(74) *Attorney, Agent, or Firm* — Nokia Solutions and Networks Oy

(57) ABSTRACT

Disclosed is a method comprising initiating, by an apparatus, an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

15 Claims, 8 Drawing Sheets

(56) References Cited

U.S. PATENT DOCUMENTS

| | | | |
|---|---|---|---|
| 2018/0288729 A1* | 10/2018 | Li | G01S 19/01 |
| 2019/0239181 A1 | 8/2019 | Gangakhedkar et al. | |
| 2020/0196101 A1 | 6/2020 | Edge | |
| 2020/0305116 A1 | 9/2020 | Berggren et al. | |
| 2020/0408871 A1 | 12/2020 | Da et al. | |
| 2021/0014900 A1 | 1/2021 | Lei et al. | |
| 2021/0289465 A1 | 9/2021 | Lee et al. | |
| 2021/0345287 A1 | 11/2021 | Alawieh et al. | |
| 2021/0410103 A1 | 12/2021 | Zhang et al. | |
| 2021/0410181 A1 | 12/2021 | Jeon et al. | |
| 2022/0015057 A1 | 1/2022 | Bao et al. | |
| 2022/0039053 A1 | 2/2022 | Edge et al. | |
| 2023/0047361 A1 | 2/2023 | Bao et al. | |

FOREIGN PATENT DOCUMENTS

| | | |
|---|---|---|
| GB | 2582788 A | 10/2020 |
| WO | 2018/068817 A1 | 4/2018 |
| WO | 2021/032280 A1 | 2/2021 |
| WO | 2021/063248 A1 | 4/2021 |
| WO | 2022/031974 A1 | 2/2022 |
| WO | 2022/154861 A1 | 7/2022 |
| WO | WO-2022177489 A1 * | 8/2022 |
| WO | 2022/184227 A1 | 9/2022 |
| WO | WO-2023011349 A1 * | 2/2023 |

OTHER PUBLICATIONS

"3rd Generation Partnership Project; Technical Specification Group Services and System Aspects; 5G System (5GS) Location Services (LCS); Stage 2 (Release 17)", 3GPP TS 23.273, V17.2.0, Sep. 2021, pp. 1-99.

"Summary of [AT116-e][615][POS] PRUs", 3GPP TSG-RAN WG2 Meeting #116-e, R2-2111364, Agenda: 8.11.7, Qualcomm Incorporated, Nov. 1-12, 2021, pp. 1-19.

"Msc-generator", Sourceforge, Retrieved on Sep. 25, 2023, Webpage available at : https://sourceforge.net/projects/msc-generator/.

"3rd Generation Partnership Project; Technical Specification Group Radio Access Network; Study on NR Positioning Enhancements; (Release 17)", 3GPP TR 38.857, V17.0.0, Mar. 2021, 545 pages.

"Discussion on PRU", 3GPP TSG-RAN WG2 Meeting #116-e, R2-2110177, Agenda: 8.11.7, Huawei, Nov. 1-12, 2021, pp. 1-4.

"[Draft] LS on Positioning Reference Units (PRUs) for enhancing positioning performance", 3GPP TSG RAN WG1 Meeting #105-e, R1-2106265, CATT, May 19-27, 2021, 1 page.

"5G; NG-RAN; NR Positioning Protocol A (NRPPa) (3GPP TS 38.455 version 16.1.0 Release 16)", ETSI TS 138 455, V16.1.0, Nov. 2020, 147 pages.

"FL Summary #3 for accuracy improvements by mitigating UE Rx/Tx and/or gNB Rx/Tx timing delays", 3GPP TSG RAN WG1 Meeting #105-e, R1-2106156, Agenda: 8.5.1, CATT, May 19-27, 2021, 92 pages.

"3rd Generation Partnership Project; Technical Specification Group Radio Access Network; LTE Positioning Protocol (LPP) (Release 16)", 3GPP TS 37.355, V16.7.0, Dec. 2021, pp. 1-299.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; Evolved Universal Terrestrial Radio Access (E-UTRA); LTE Positioning Protocol (LPP (Release 16)", 3GPP TS 36.355, V16.0.0, Jul. 2020, pp. 1-8.

"3rd Generation Partnership Project; Technical Specification Group Radio Access Network; NG-RAN; NR Positioning Protocol A (NRPPa) (Release 16)", 3GPP TS 38.455, V16.6.0, Dec. 2021, pp. 1-154.

"3rd Generation Partnership Project; Technical Specification Group Services and System Aspects; Study on enhancement to the 5GC LoCation Services (LCS); Phase 3 (Release 18)", 3GPP TR 23.700-71, V0.3.0, May 2022, pp. 1-95.

"Report of session on positioning and sidelink relay", 3GPP TSG-RAN WG2 Meeting #111-e, R2-20xxxxx, MediaTek, Aug. 17-28, 2020, pp. 1-40.

"LS on Positioning Reference Units (PRUs) for enhancing positioning performance", 3GPP TSG RAN WG1 Meeting #105-e, R1-2106326, RAN1, May 19-27, 2021, 1 page.

Office action received for corresponding Finnish Patent Application No. 20225111, dated Apr. 13, 2022, 14 pages.

"Signalling and Procedures for supporting Positioning Reference Units", 3GPP TSG-RAN WG3 Meeting #113-e, R3-213399, Agenda: 19.2.1, Qualcomm Incorporated, Aug. 16-27, 2021, pp. 1-16.

"Support of Positioning Reference Units", 3GPP TSG RAN WG2 Meeting#116bis-e, R2-2200994, Agenda: 8.11.7, Lenovo, Jan. 17-25, 2022, pp. 1-5.

"Remaining issues for Positioning Reference Units", 3GPP TSG-RAN WG2 Meeting #116-e, R2-2110826, Agenda: 8.11.7, Qualcomm Incorporated, Nov. 1-12, 2021, pp. 1-4.

Office action received for corresponding Finnish Patent Application No. 20225219, dated Jun. 27, 2022, 9 pages.

"[AT115-e][610][POS] PRUs (CATT)", 3GPP TSG-RAN WG2 Meeting #115 electronic, R2-2108940, Agenda: 8.11.1, CATT, Aug. 16-27, 2021, 28 pages.

"Signalling and Procedures for supporting Positioning Reference Units", 3GPP TSG-RAN WG2 Meeting #115-e, R2-2108386, Agenda: 8.11.7, Qualcomm Incorporated, Aug. 16-27, 2021, pp. 1-16.

Office action received for corresponding Finnish Patent Application No. 20225111, dated Sep. 9, 2022, 9 pages.

Office action received for corresponding Finnish Patent Application No. 20225219, dated Dec. 9, 2022, 6 pages.

Office action received for corresponding Finnish Patent Application No. 20225838, dated Feb. 20, 2023, 12 pages.

"Discussion on accuracy improvements by mitigating UE Rx/Tx and/or gNB Rx/Tx timing delays", 3GPP TSG RAN WG1 #105-e, R1-2104520, Agenda: 8.5.1, CATT, May 19-27, 2021, pp. 1-21.

International Search Report and Written Opinion received for corresponding Patent Cooperation Treaty Application No. PCT/EP2022/071662, dated Mar. 14, 2023, 18 pages.

"3rd Generation Partnership Project; Technical Specification Group Services and System Aspects; Study on Architecture Enhancement to support Ranging based services and sidelink positioning (Release 18)", 3GPP TR 23.700-86, V0.3.0, Jun. 2022, pp. 1-107.

"Solution for KI#5: Network assisted Sidelink Positioning for in Network Coverage and Partial Network Coverage", 3GPP TSG-WG SA2 Meeting #150E e-meeting, S2-2203345, Agenda: 9.20, Huawei, Apr. 6-12, 2022, pp. 1-5.

"KI #6, Sol #9: Update to add selection of initiator UE from UE1 and UE2 by LMF", 3GPP TSG-WG SA2 Meeting #151E e-meeting, S2-2205063, Agenda: 9.20, Huawei, May 16-20, 2022, pp. 1-6.

"Potential solutions for SL positioning", 3GPP TSG RAN WG1 #109-e, R1-2204835, Agenda: 9.5.1.3, Fraunhofer IIS, May 9-20, 2022, 10 pages.

International Search Report and Written Opinion received for corresponding Patent Cooperation Treaty Application No. PCT/EP2023/051239, dated Apr. 20, 2023, 12 pages.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.7.0, Dec. 2021, pp. 1-121.

International Search Report and Written Opinion received for corresponding Patent Cooperation Treaty Application No. PCT/FI2023/050102, dated May 24, 2023, 13 pages.

Office action received for corresponding Finnish Patent Application No. 20225838, dated Jul. 4, 2023, 6 pages.

Office action received for corresponding Finnish Patent Application No. 20235707, dated Sep. 1, 2023, 9 pages.

"3rd Generation Partnership Project; Technical Specification Group Services and System Aspects; Study on enhancement to the 5GC LoCation Services (LCS); Phase 3 (Release 18)", 3GPP TR 23.700-71, V1.0.0, Sep. 2022, pp. 1-146.

Non-Final Office action received for corresponding U.S. Appl. No. 18/475,131, dated Nov. 30, 2023, 10 pages.

(56) References Cited

OTHER PUBLICATIONS

Extended European Search Report received for corresponding European Patent Application No. 23198104.4, dated Feb. 22, 2024, 8 pages.
"Discussion on Positioning Reference Units (PRUs) for positioning enhancement", 3GPP TSG-RAN WG2 Meeting #115 electronic, R2-2107143, Agenda: 8.11.7, CATT, Aug. 16-27, 2021, 6 pages.
Extended European Search Report received for corresponding European Patent Application No. 23198178.8, dated Feb. 29, 2024, 8 pages.

* cited by examiner

POSITIONING REFERENCE UNIT SELECTION

FIELD

The following example embodiments relate to wireless communication and to positioning.

BACKGROUND

Positioning technologies may be used to estimate a physical location of a device. It is desirable to improve the positioning accuracy in order to estimate the location of the device more accurately.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions which, when executed by the at least one processor, cause the apparatus at least to: initiate an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided an apparatus comprising: means for initiating an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided a method comprising: initiating, by an apparatus, an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided a computer program comprising instructions which, when executed by an apparatus, cause the apparatus to perform at least the following: initiating an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided a computer readable medium comprising program instructions which, when executed by an apparatus, cause the apparatus to perform at least the following: initiating an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided a non-transitory computer readable medium comprising program instructions which, when executed by an apparatus, cause the apparatus to perform at least the following: initiating an activation procedure for activating one or more positioning reference units for a positioning session of the apparatus; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units.

According to another aspect, there is provided a system comprising at least a location management function and a user device. The user device is configured to: initiate an activation procedure for activating one or more positioning reference units for a positioning session of the user device; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units. The location management function is configured to: obtain a first set of measurement information associated with a reference signal transmitted from a set of positioning reference units, wherein the set of positioning reference units comprises at least the one or more positioning reference units activated for the positioning session of the user device; select a subset of positioning reference units from the set of positioning reference units, wherein the selection is based at least on determining that the reference signal transmitted per positioning reference unit of the subset of positioning reference units is measured by a same set of network nodes that measured a reference signal transmitted from the user device; and refine a location estimate of the user device based at least on a subset of measurement information from the first set of measurement information, wherein the subset of measurement information is associated with the subset of positioning reference units.

According to another aspect, there is provided a system comprising at least a location management function and a user device. The user device comprises: means for initiating an activation procedure for activating one or more positioning reference units for a positioning session of the user device; wherein the activation procedure is initiated via a small data transmission based on at least one of: a number of detected network nodes being above a first threshold value, or a number of detected positioning reference units being above a second threshold value; or wherein the activation procedure is initiated by transmitting an activation request to the one or more positioning reference units over sidelink based on the number of detected positioning reference units comprising at least the one or more positioning reference units. The location management function comprises: means for obtaining a first set of measurement information associated with a reference signal transmitted from a set of positioning reference units, wherein the set of positioning reference units comprises at least the one or more positioning reference units activated for the positioning session of the user device; means for selecting a subset of positioning reference units from the set of positioning reference units, wherein the selection is based at least on determining that the reference signal transmitted per positioning reference unit of the subset of positioning reference units is measured by a same set of network nodes that measured a reference signal transmitted from the user device; and means for refining a location estimate of the user device based at least on a subset of measurement information from the first set of measurement information, wherein the subset of measurement information is associated with the subset of positioning reference units.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
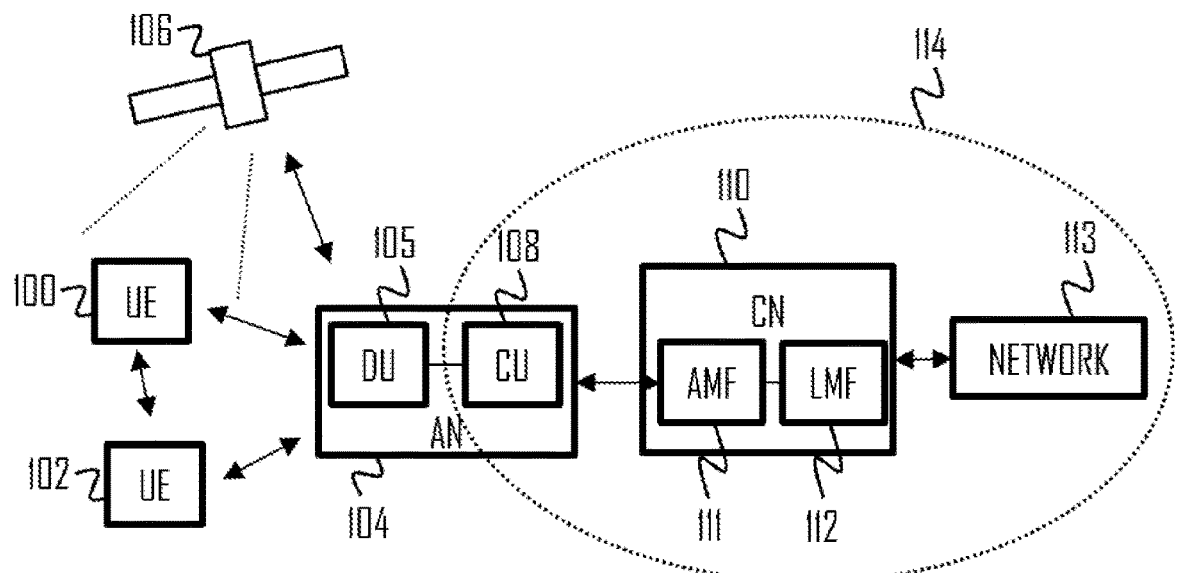

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

With respect to positioning, the service-based architecture (core network) may comprise an AMF 111 and a location management function (LMF) 112. The AMF may provide location information for call processing, policy, and charging to other network functions in the core network and to other entities requesting for positioning of terminal devices. The AMF may receive and manage location requests from several sources: mobile-originated location requests (MO-LR) from the user devices and mobile-terminated location requests (MT-LR) from other functions of the core network or from other network elements. The AMF may select the LMF for a given request and use its positioning service to trigger a positioning session. The LMF may then carry out the positioning upon receiving such a request from the AMF. The LMF may manage the resources and timing of positioning activities. The LMF may use a Namf_Communication service on an NL1 interface to request positioning of a user device from one or more access nodes, or the LMF may communicate with the user device over N1 for UE-based or UE-assisted positioning. The positioning may include estimation of a location and, additionally, the LMF may also estimate movement or accuracy of the location information when requested. Connection-wise, the AMF may be between the access node and the LMF and, thus, closer to the access nodes than the LMF.

A positioning session may be associated with signaling for activation of devices and/or signals, delivery of assistance data, reporting of measurement information, as well as estimating the location of the UE. The positioning session may start with a positioning request.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with one or more other networks 113, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or the like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (in a distributed unit, DU 105) and non-real time functions being carried out in a centralized manner (in a centralized unit, CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay node or by an access node 104 located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Positioning technologies may be used to estimate a physical location or a geographic location of a user device. Herein the user device to be positioned is referred to as a target UE or target user device. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT).

In wireless positioning, multiple positioning anchors in known locations may transmit and/or receive one or more positioning reference signals (PRS) to/from the target UE. In the uplink, a sounding reference signal (SRS) may be used as a positioning reference signal. For example, multilateration techniques may then be used to localize (i.e., position) the target UE with respect to the positioning anchors. The positioning anchors may also be referred to as anchors, anchor nodes, multilateration anchors, or reference points herein. The positioning anchors may be, for example, radio access nodes (e.g., gNBs) or transmission and reception points (TRPs) (in uplink/downlink positioning), or other UEs (in sidelink positioning).

Sidelink (SL) positioning refers to the positioning approach, where the target UE utilizes the sidelink (i.e., the direct device-to-device link) to position itself, either in an absolute manner (in case of absolute positioning, where the coordinates of the target UE are obtained in the form of global or local Cartesian coordinates) or in a relative manner (in case of relative positioning, where the location of the target UE is estimated with respect to another entity, for example another non-static or anchor UE). For UE-assisted positioning, the target UE may utilize the sidelink to obtain positioning measurements and report the measurements to a network entity such as a location management function (LMF). Sidelink positioning may also be used to obtain ranging information. Ranging means determination of the distance and/or the direction between the target UE and another entity, such as an anchor UE.

Sidelink positioning involves the use of a supporting UE or a set of supporting UEs, referred to as the "anchor UE(s)", which assist(s) the positioning session of the target UE. The anchor UE support can be implemented in various ways, including the anchor UE(s) estimating the location of the target UE, target UE obtaining positioning assistance data by the anchor UE(s), etc., and the target UE measuring reference signals from the anchor UE(s) (or vice versa) for positioning purposes.

Furthermore, positioning reference units may be used in the positioning session for increasing the positioning accuracy for positioning the target UE. A positioning reference unit (PRU) at a known location may perform positioning measurements, such as reference signal time difference (RSTD), reference signal received power (RSRP), UE reception-transmission time difference measurements, etc., and report these measurements to a location server such as an LMF. In addition, the PRU may transmit an UL SRS for positioning to enable transmission and reception points (TRPs) to measure and report UL positioning measurements (e.g., relative time of arrival, UL-AoA, gNB reception-transmission time difference, etc.) from PRUs at a known location. The PRU measurements may be compared by the location server with the measurements expected at the known PRU location to determine correction terms for other nearby target UEs. The DL and/or UL location measurements for other target UEs can then be corrected based on the previously determined correction terms. From a location server perspective, the PRU functionality may be realized by a UE with a known location.

A difference between a PRU and an anchor UE is that an anchor UE may not know its own location, whereas a PRU may know its own location. PRUs may also serve as positioning anchors for the target UE, or they may just provide correction data (e.g., to LMF) to help in positioning the target UE.

In other words, PRUs located at known locations may act as reference target UEs, such that their calculated position is compared with their known location. The comparison of the known and estimated location may result in correction data, which can be used for the location estimation process of other target UEs in the vicinity, under the assumption that the same or similar accuracy determination effects apply to both the location of the PRU and the location of the other target UE(s). Then, the correction data may be used for fine-tuning the location estimate of the target UE(s), thereby increasing the positioning accuracy.

The location of a UE can be calculated either at the network, for example at the LMF (in the case of LMF-based positioning), or at the UE itself (in the case of UE-based positioning).

The measurements for positioning can be carried out either at the UE side (e.g., in case of DL positioning) or at the network side (e.g., in case of UL positioning).

Figure 2:
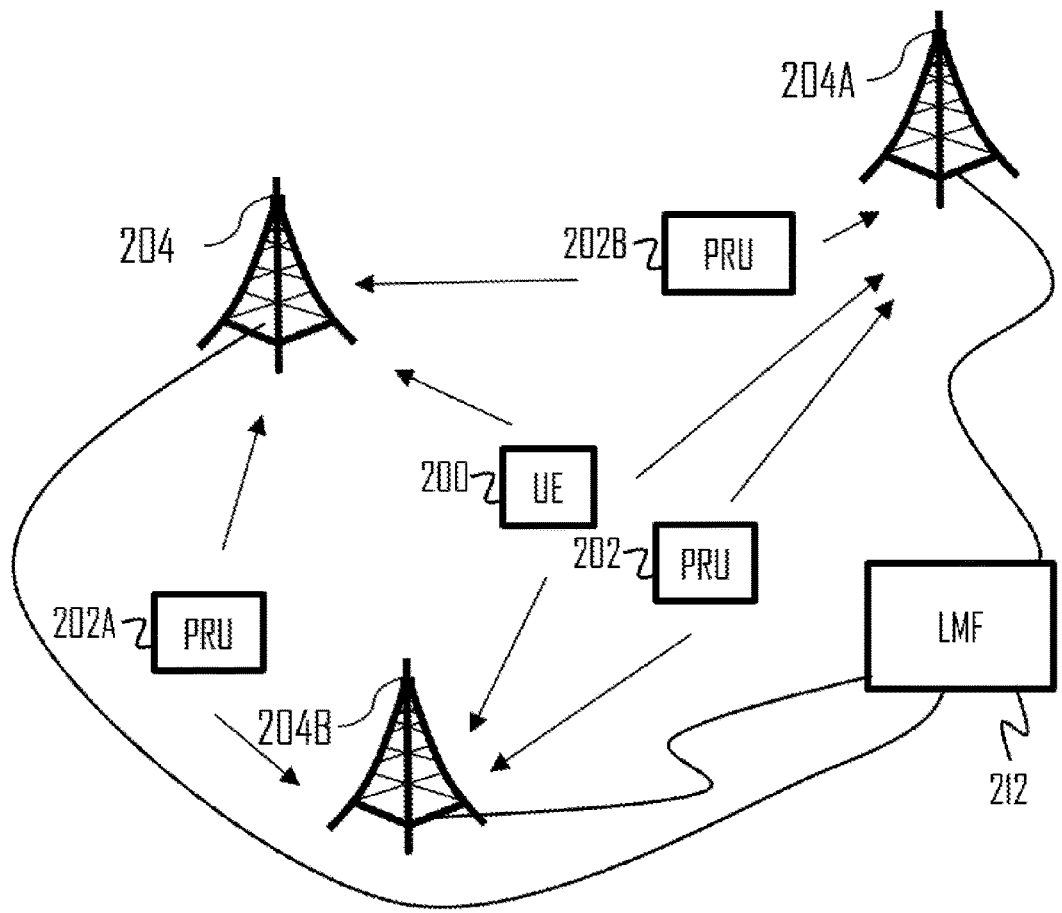
FIG. 2 illustrates an example of a positioning scenario.

FIG. 2 illustrates an example, where one or more PRUs 202, 202A, 202B are used for positioning a target UE 200. The PRUs may be configured to transmit reference signals that are measured for the purpose of positioning the target UE 200. The target UE 200 may further transmit a reference signal for the purpose of positioning the target UE 200. One or more access nodes 204, 204A, 204B may measure the reference signals received from the PRU(s) 202, 202A, 202B and from the target UE 200. In case of sidelink positioning, the target UE 200 may measure reference signals received from the PRU(s) 202, 202A, 202B, and/or the PRU(s) 202, 202A, 202B may measure reference signals received from the target UE and/or from other UEs or PRUs. Measured parameters (measurement data) derived from the received reference signals may include a reference signal reception time, reference signal time difference (RSTD), reference signal angle-of-arrival, and/or RSRP, for example. The measurement data may be reported to a network element acting as a location management function (LMF) 212 configured to carry out the positioning on the basis of the measurement data. The LMF 212 may estimate a location of the target UE 200 on the basis of the received measurement data and the known locations of the PRU(s) measured by the reporting access node(s). For example, location estimation functions used in real-time kinematic positioning (RTK) applications of global navigation satellite systems may be employed. As an example, if the measurements indicate that signals received from the target UE 200 and one of the PRU(s) 202 have high correlation, the location of the target UE 200 may be estimated to be close to that PRU 202 and further away from the other PRUs 202A, 202B. A correction from the location of a given PRU 202A, 202B may be computed on the basis of the measurement data, for example by using the difference between the measurement data associated with the target UE 200 and the measurement data associated with the closest PRU 202. For example, multi-lateration measurements (multiple measurements of the RSRP, RSTD, and/or other parameters) may indicate that the target UE 200 is to a certain direction from the closest PRU 202, and the correction may be made to that direction.

There may be various procedures for activating PRU(s). Thus, there is a challenge as to which procedure is followed to activate PRU(s) for a given positioning service request. For example, the LTE positioning protocol (LPP) procedures may be followed for PRUs as well, similar to target UEs. This means that whenever a PRU is to be activated, the LMF may initiate a location service (LCS) request for that PRU. However, associating the proper PRU (or set of PRUs) to the target UE is not a trivial process, since the network may not know in advance which PRUs can indeed be used as reference devices for applying corrections for positioning the target UE. This relates to the problem described in the following.

Determining and activating the proper PRU(s) for a positioning session, namely finding the right PRU(s) to use its correction data for accurate positioning of a given target UE in the sense of low geometric dilution of precision (GDOP), within a short time (latency constraint) and with minimal overhead, is challenging. For example, in low latency positioning applications, the (accurate) position of a UE needs to be estimated within a short time. Some examples of such low latency applications may include automotive use cases, where the UE itself may initiate the positioning process for example via a mobile-originated location request (MO-LR). In other words, MO-LR means that the request to locate the target UE comes from the target UE itself.

For example, the positioning latency requirements may be set to just a few milliseconds. If we count the additional time needed to select and configure the proper PRU (that is, the PRU that is used to provide assistance data for fine-tuning the target UE location), the low latency becomes even more challenging.

Another challenging aspect is that, in contrast to global navigation satellite system (GNSS) positioning, in terrestrial positioning, the technique to refine the positioning accuracy based on correction data may require that the PRU and the target UE experience the same (or substantially same) radio conditions. That is, in order to be able to apply the same correction data for the target UE as that of the PRU, the target UE and PRU may need to be measured by the same set of TRPs and with the same conditions (e.g., line-of-sight, bandwidth, measurement capability, etc). This means that the PRU and target UE should have similar measurement capabilities and be physically located as close as possible to one another.

The LPP-based legacy approach for activating a PRU may require that the LMF initiates an LCS request to the PRU after it receives the LCS request for the target UE. Also, the LMF may need to have an as-accurate-as-possible estimation of the target UE location for identifying the proper PRU. This results in high latency, since in principle it means that the LMF may need to run two positioning processes, one after another: one process for estimating the location of the target UE; then another process to activate the PRU based on the stored database and estimate the location of the PRU. Finally, based on the estimated location of the PRU, the LMF may refine the location estimate of the target UE.

Given the activated PRUs with their measurements available, some example embodiments may enable selecting one or more PRUs and/or measurements at the LMF side to associate with the target UE measurements, in order to improve the accuracy of the location estimate of the target UE.

Some example embodiments may be used for example for UL positioning, since UL positioning may be suitable for correcting the target UE location using correction data by the PRU. In DL positioning, there would be the additional requirement that the PRU and the target UE should have the same (or very similar) measurement capabilities, whereas this is not the case for UL positioning, where the measurements (by both target UE and PRU) are carried out by the same gNBs or TRPs.

However, some example embodiments are not limited to UL positioning, and they may also be used for example for sidelink positioning.

For processing the reported measurements of activated PRUs at the LMF, to select and associate PRU(s) from a given list with a set of positioning measurements, to improve the location estimate of a target UE, some example embodiments may be based on the following principles:

1) A PRU should be associated to a target UE, if the SRS from the PRU is measured by the same set of gNBs/TRPs that are measuring the SRS from the target UE. In other words, the same set of gNBs/TRPs should be involved in the PRU positioning sessions and the target UE positioning session. This is to ensure that the PRU is within sufficient proximity to the target UE.

2) Furthermore, the time of flight of the SRS emanating from the PRU should be similar to (i.e., within certain thresholds/limits) the time of flight of the target UE SRS. This is to ensure that the PRU experiences similar line of sight (LOS) conditions with the target UE, such that if the target UE sees a set of gNBs with LOS, then the PRU sees the same set of gNBs with LOS as well.

Some example embodiments are described below using principles and terminology of 5G technology without limiting the example embodiments to 5G communication systems, however.

Figure 3:
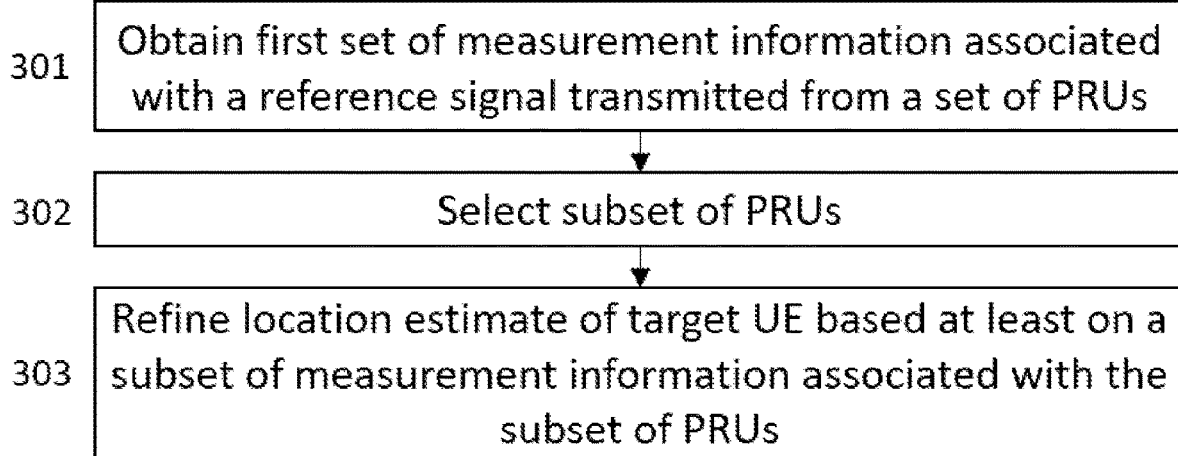
FIG. 3 illustrates a flow chart according to an example embodiment.

FIG. 3 illustrates a flow chart according to an example embodiment of a method performed by an apparatus such as, or comprising, or comprised in, a network element of a core network. For example, the network element may be a location management function (LMF). The network element may correspond to the LMF 112 of FIG. 1 and/or to the LMF 212 of FIG. 2.

Referring to FIG. 3, in block 301, a first set of measurement information is obtained, wherein the first set of measurement information is associated with a reference signal transmitted from a set of positioning reference units. For example, the first set of measurement information may be received from one or more network nodes (e.g., gNB or TRP) that measured the received reference signal.

For example, the first set of measurement information may comprise at least one of the following measurements of the reference signal transmitted from a given PRU of the set of positioning reference units: reference signal received power (RSRP), reference signal received quality (RSRQ), received signal strength indicator (RSSI), signal-to-noise ratio (SNR), signal-to-interference-plus-noise ratio (SINR), time of arrival, reception-transmission (Rx-Tx) time difference, relative time of arrival (RTOA), angle of arrival (azimuth and elevation), beam information, time stamp of the measurement, and/or quality of a given measurement.

The reference signal transmitted from the set of positioning reference units may be any signal, for example an uplink sounding reference signal (UL SRS) or a sidelink positioning reference signal (SL PRS).

In block 302, a subset of positioning reference units is selected from the set of positioning reference units, wherein the selection is based at least on determining that the reference signal transmitted per positioning reference unit of the subset of positioning reference units is measured by a same set of network nodes that measured a reference signal transmitted from a target user device.

The reference signal transmitted from the target user device may be any signal, for example an uplink sounding reference signal (UL SRS) or a sidelink positioning reference signal (SL PRS).

The set of network nodes may comprise one or more network nodes, such as gNB(s) or TRP(s).

In block 303, a location estimate of the target user device is refined based at least on a subset of measurement information from the first set of measurement information, wherein the subset of measurement information is associated with the subset of positioning reference units.

The refinement of the location estimate may mean using the subset of measurement information to provide correction data for fine-tuning a previously obtained location estimate of the target user device, thereby increasing its accuracy. The subset of measurement information may be used to calculate the location of the subset of PRUs, and the calculated location of the subset of PRUs may then be compared with the known location (true location) of these PRUs to obtain correction data that may be applied to the location estimate of the target user device. This correction data may be used to correct the location estimate of the target user device, which may have similar channel conditions as the considered subset of PRUs.

The target user device may also be referred to as a target UE herein.

Figure 4:
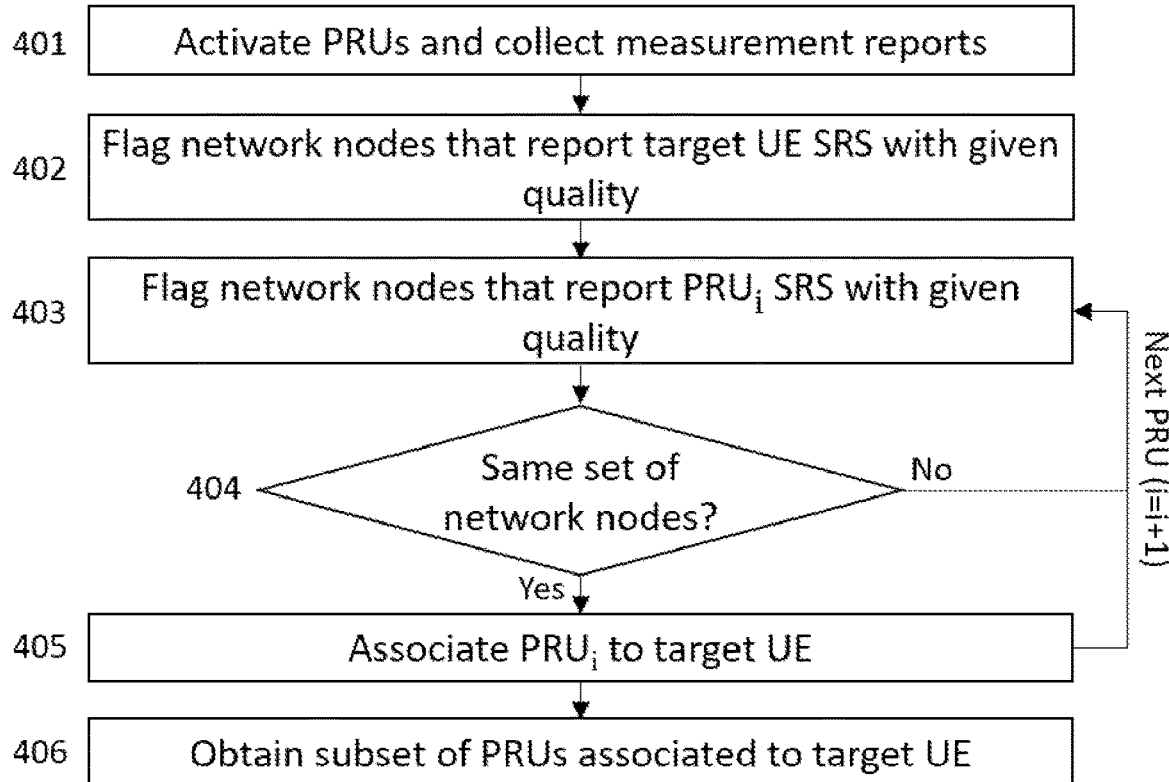
FIG. 4 illustrates a flow chart according to an example embodiment.

FIG. 4 illustrates a flow chart according to an example embodiment of a method performed by an apparatus such as, or comprising, or comprised in, a network element of a core network. For example, the network element may be a location management function (LMF). The network element may correspond to the LMF 112 of FIG. 1 and/or to the LMF 212 of FIG. 2.

FIG. 4 illustrates an example of how the subset of positioning reference units may be selected for block 302 of FIG. 3. In this example embodiment, the LMF may downselect among the activated PRUs to optimize the selection of PRU measurements for improving the location estimate of the target user device. This example embodiment at the network (e.g., LMF) side is based on comparing the set of network nodes that are measuring a reference signal (e.g., UL SRS) from the target user device and the PRUs, such that a PRU is deemed associated to the target user device if its reference signal is measured by the same set of network nodes as the reference signal of the target user device.

Referring to FIG. 4, in block 401, the apparatus (e.g., LMF) receives a PRU activation request message and activates the associated set of positioning reference units. Alternatively, the set of positioning reference units may be activated by the target user device or by one or more network nodes. The activated PRUs and the target user device may transmit a reference signal such as UL SRS. One or more network nodes such as gNB(s) or TRP(s) that are able to measure the SRS with a given quality, for example by measuring RSRP within a certain range, may report measured values to the apparatus. The apparatus collects the measurement reports.

In block 402, one or more first network nodes are flagged based on a second set of measurement information reported from the one or more first network nodes being within one or more limits, wherein the second set of measurement information is associated with the reference signal transmitted from the target user device. The one or more first network nodes may also be denoted as set A herein. The one or more first network nodes may comprise, for example, one or more gNBs or TRPs.

The second set of measurement information may refer to the measurement reports associated with the target user device. For example, the second set of measurement information may comprise at least one of the following measurements of the reference signal transmitted from the target user device: reference signal received power (RSRP), reference signal received quality (RSRQ), received signal strength indicator (RSSI), signal-to-noise ratio (SNR), signal-to-interference-plus-noise ratio (SINR), time of arrival, reception-transmission (Rx-Tx) time difference, UL relative time of arrival (RTOA), UL angle of arrival (azimuth and elevation), beam information, time stamp of the measurement, and/or quality of a given measurement.

The second set of measurement information being within one or more limits may mean, for example, that a reported RSRP value included in the second set of measurement information is within a certain range, i.e., above a lower limit and/or below an upper limit. In other words, as an example, the apparatus (e.g., LMF) may flag the gNB(s) or TRP(s) that report the target user device's SRS with sufficient quality (e.g., received SRS RSRP within a certain range).

In block 403, the apparatus flags, per positioning reference unit of the set of positioning reference units, one or more second network nodes based on the first set of measurement information reported from the one or more second network nodes being within the one or more limits. The one or more second network nodes may also be denoted as set B herein. The one or more second network nodes may comprise, for example, one or more gNBs or TRPs. The one or more second network nodes may be the same or different than the one or more first network nodes.

The first set of measurement information may refer to the measurement reports associated with a given PRU of the set of PRUs. For example, the first set of measurement information may comprise at least one of the following measurements of the reference signal transmitted from the positioning reference unit: reference signal received power (RSRP), reference signal received quality (RSRQ), received signal strength indicator (RSSI), signal-to-noise ratio (SNR), signal-to-interference-plus-noise ratio (SINR), time of arrival, reception-transmission (Rx-Tx) time difference, UL relative time of arrival (RTOA), UL angle of arrival (azimuth and elevation), beam information, time stamp of the measurement, and/or quality of a given measurement.

The first set of measurement information being within the one or more limits may mean, for example, that an RSRP value included in the first set of measurement information is within a certain range, i.e., above a lower limit and/or below an upper limit. In other words, as an example, for each candidate PRU, the apparatus may flag the gNB(s) or TRP(s) that report PRU SRS with sufficient quality (e.g., received SRS RSRP within a similar range as the target user device's SRS RSRP).

In block 404, the apparatus compares, per positioning reference unit of the set of positioning reference units, identities of the one or more first network nodes and the one or more second network nodes. In other words, the apparatus may compare the identities of the gNBs or TRPs belonging in Set A and Set B.

Based on the comparison of the identities, the apparatus may determine whether the reference signal transmitted per positioning reference unit of the subset of positioning reference units is measured by the same set of network nodes that measured the reference signal transmitted from the target user device. In other words, if the identities of the one or more first network nodes and the one or more second network nodes are the same, then the apparatus may determine that they comprise the same set of network nodes.

If the identities of set A and set B are not the same (block 404: no), then this PRU is not associated to the target user device, and the process returns to block 403 for processing the next PRU in the set of PRUs.

Alternatively, in block 405, if the identities of set A and set B are the same (block 404: yes), then this PRU is associated to the target user device and selected to the subset of positioning reference units.

Following block 405, the process may return to block 403 for processing the next PRU in the set of PRUs. In other words, blocks 403-405 may be performed iteratively until all the PRUs in the set of PRUs are processed.

In block 406, after all the PRUs in the set of PRUs are processed, the apparatus obtains the subset of positioning reference units, which comprises the PRUs associated to the target user device.

Figure 5:
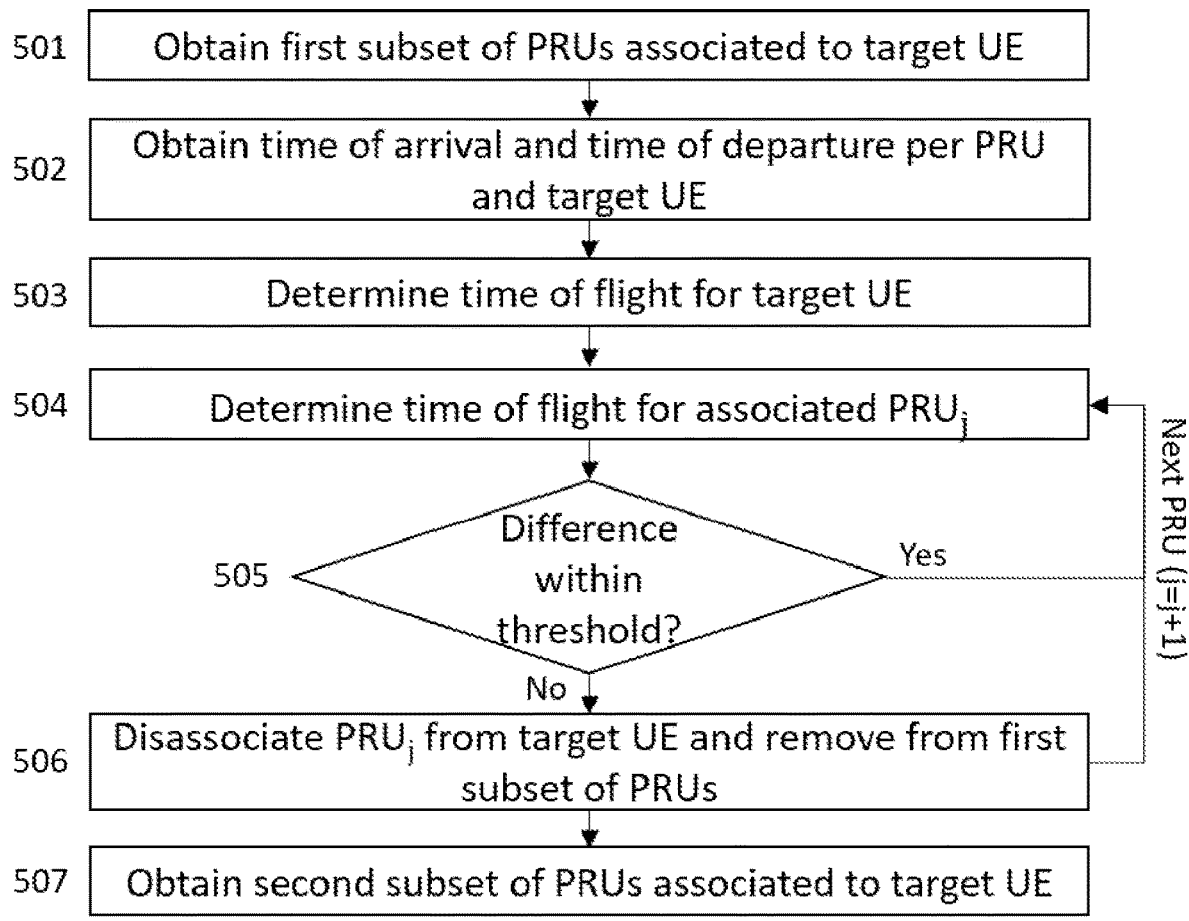
FIG. 5 illustrates a flow chart according to an example embodiment.

FIG. 5 illustrates a flow chart according to an example embodiment of a method performed by an apparatus such as, or comprising, or comprised in, a network element of a core network. For example, the network element may be a location management function (LMF). The network element may correspond to the LMF 112 of FIG. 1 and/or to the LMF 212 of FIG. 2.

FIG. 5 illustrates another example of how the subset of positioning reference units may be selected for block 302 of FIG. 3. FIG. 5 illustrates how to down-select the subset of PRUs associated per target user device. The method of FIG. 5 may be performed additionally or alternatively to the method of FIG. 4.

In this example embodiment, out of the subset of PRUs obtained for example as described above with reference to FIG. 4, the LMF may perform a down-selection to those PRUs that correspond to a measured reference signal whose time of flight is within certain limits compared to the time of flight of the target user device's reference signal.

In other words, in this example embodiment, the subset of positioning reference units may be selected based further on a time of flight of the reference signal transmitted per positioning reference unit of the subset of positioning reference units compared to a time of flight of the reference signal transmitted from the target user device. For each PRU associated to the target user device, the apparatus (e.g., LMF) may carry out another association process based on time of flight, and down-select the PRUs associated to the target user device, as described in the following.

Referring to FIG. 5, in block 501, a subset of positioning reference units is obtained for example as described above with reference to FIG. 4. This subset may be referred to as a first subset of positioning reference units.

In block 502, a time of arrival and a time of departure is obtained for a reference signal (e.g., UL SRS) transmitted by the target user device and each positioning reference unit of the first subset of positioning reference units.

For example, the apparatus (e.g., LMF) may collect a time of arrival (ToA) value reported by one or more network nodes (e.g., gNBs or TRPs) that measure the time of arrival of the reference signal transmitted by each PRU and the target user device.

The apparatus (e.g., LMF) may obtain the scheduled time of departure of the reference signal for each PRU and the target user device for example from the serving gNB of the PRU and the target user device via NR positioning protocol A (NRPPa). The PRU and the target user device may be served by the same or different gNB.

In block 503, the apparatus (e.g., LMF) determines, or calculates, a time of flight value of the target user device, wherein the time of flight value of the target user device indicates a difference between the time of departure of the reference signal transmitted from the target user device and the time of arrival of the reference signal transmitted from the target user device. In other words, the time of flight of the target user device may be defined as the difference between the scheduled time of departure and the reported time of arrival of the reference signal transmitted from the target user device.

In block 504, the apparatus (e.g., LMF) determines, or calculates, a time of flight value per positioning reference unit of the first subset of positioning reference units, wherein the time of flight value per positioning reference unit indicates a difference between the time of departure of the reference signal transmitted from the positioning reference unit and the time of arrival of the reference signal transmitted from the positioning reference unit. In other words, the time of flight of a given PRU may be defined as the difference between the scheduled time of departure and the reported time of arrival of the reference signal transmitted by that PRU.

In block 505, the apparatus (e.g., LMF) compares the time of flight value of the target user device and the time of flight value per positioning reference unit.

If the difference between the time of flight values is not larger than the threshold value (block 505: yes), then the process may return to block 504 for processing the next PRU in the first subset of PRUs. The threshold value may be defined based on positioning requirements, for example.

Alternatively, in block 506, if the difference between the time of flight values is larger than the threshold value (block 504: no), the PRU is removed from the list of PRUs associated to the target user device. In other words, the apparatus (e.g., LMF) may remove one or more positioning reference units from the first subset of positioning reference units based on the comparison of the time of flight value of the target user device and the time of flight value of the one or more positioning reference units being larger than the threshold value.

After block 506, the process may return to block 504 for processing the next PRU in the first subset of PRUs. In other words, blocks 504-506 may be performed iteratively until all PRUs in the first subset of positioning reference units are processed.

In block 507, the LMF obtains a second subset of PRUs associated to the target user device. The second subset of PRUs may be a subset of the first subset of PRUs, i.e., the second subset of PRUs may be obtained by removing one or more PRUs from the first subset of PRUs based on the time of flight as described above.

The LMF may use the second subset of PRUs to perform refinement (fine-tuning) of the location estimate of the target user device as described for block 303 of FIG. 3. In other words, the subset of PRUs mentioned in block 302 of FIG. 3 may refer to the second subset of PRUs obtained herein. In this case, in block 303 of FIG. 3, the subset of measurement information may be associated with the reference signal transmitted from the second subset of positioning reference units, from which the one or more positioning reference units are removed compared to the first subset of positioning reference units.

Figure 6:
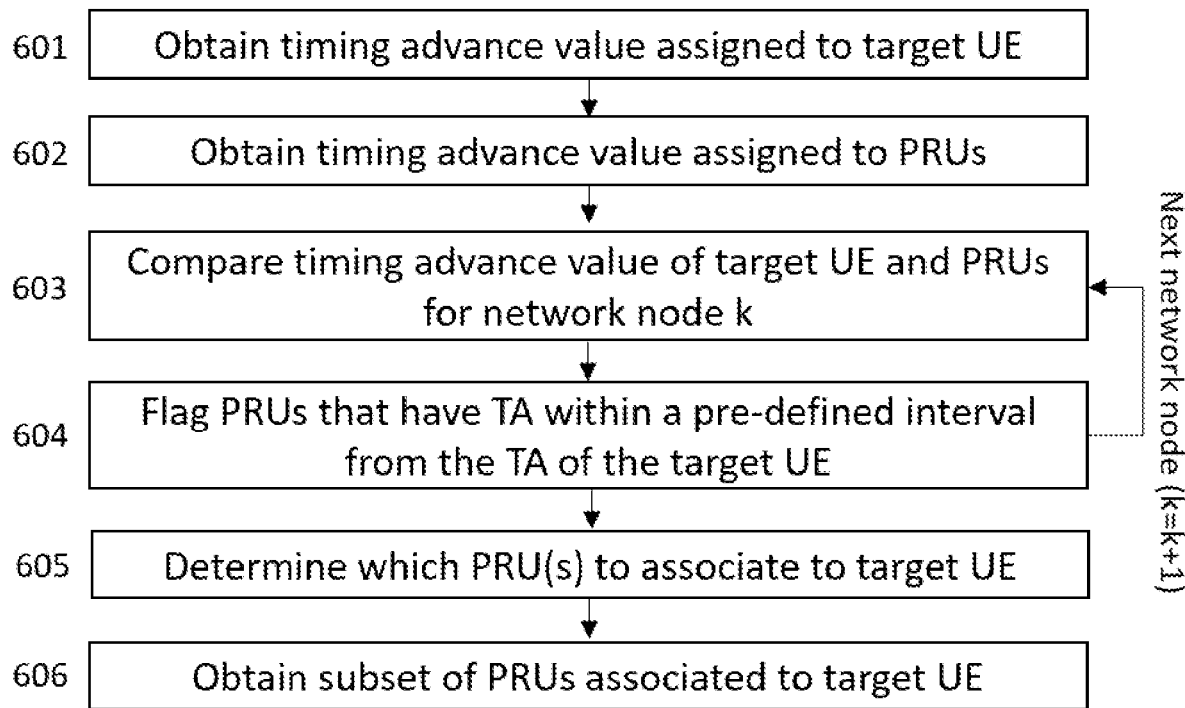
FIG. 6 illustrates a flow chart according to an example embodiment.

FIG. 6 illustrates a flow chart according to an example embodiment of a method performed by an apparatus such as, or comprising, or comprised in, a network element of a core network. For example, the network element may be a location management function (LMF). The network element may correspond to the LMF 112 of FIG. 1 and/or to the LMF 212 of FIG. 2.

FIG. 6 illustrates another example of how the subset of positioning reference units may be selected for block 302 of FIG. 3. In this example embodiment, the subset of positioning reference units may be selected based further on a timing advance per positioning reference unit of the subset of positioning reference units compared to a timing advance of the target user device. In other words, the apparatus (e.g., LMF) may associate one or more PRUs to the target user device based on the similarity of timing advance (TA) to different network nodes (e.g., gNBs or TRPs). The method of FIG. 6 may be performed additionally or alternatively to any of the methods of FIGS. 4-5.

Referring to FIG. 6, in block 601, the apparatus (e.g., LMF) obtains a timing advance value assigned to the target user device by a plurality of network nodes.

In block 602, the apparatus (e.g., LMF) obtains a timing advance value assigned to the set of positioning reference units by the plurality of network nodes.

In block 603, the apparatus (e.g., LMF) compares, per network node of the plurality of network nodes, the timing advance value of the target user device and the timing advance value of the set of positioning reference units.

In block 604, the apparatus (e.g., LMF) flags, per network node of the plurality of network nodes, one or more PRUs whose timing advance value is within a pre-defined interval compared to the timing advance value of the target user device. The interval may be based on positioning accuracy requirements.

After block 604, the process may return to block 603 for processing the next network node of the plurality of network nodes. In other words, blocks 603-604 may be performed iteratively until each network node of the plurality of network nodes is processed. Thus, for each network node, the LMF may flag the PRUs that have TA within a certain interval around the TA of the target user device.

In block 605, after processing all network nodes of the plurality of network nodes, the apparatus (e.g., LMF) determines which PRU(s) to associate with the target user device based on the number of network nodes, for which the PRU(s) have been flagged. For example, the LMF may determine to associate one or more PRUs that are flagged for a higher number of network nodes than the other PRUs (i.e., the more gNBs/TRPs, the better).

In block 606, the apparatus (e.g., LMF) obtains the subset of positioning reference units, which comprises the PRUs associated to the target user device. In other words, the subset of positioning reference units may be selected based on the number of network nodes, for which the timing advance value of the subset of positioning reference units is within the pre-defined interval compared to the timing advance value of the target user device. For example, the LMF may select one or more PRUs that are flagged for a higher number of network nodes than the other PRUs.

Figure 7:
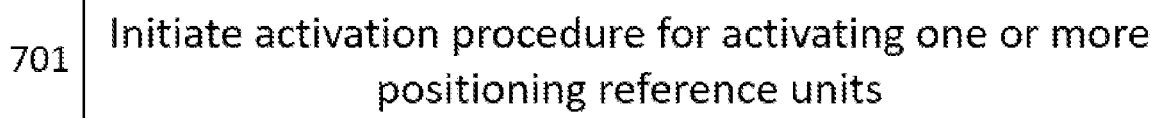
FIG. 7 illustrates a flow chart according to an example embodiment.

FIG. 7 illustrates a flow chart according to an example embodiment of a method performed by an apparatus such as, or comprising, or comprised in, a user device. The user device may also be called a subscriber unit, mobile station, remote terminal, access terminal, user terminal, terminal device, user equipment (UE), target UE, or target user device. The user device may correspond to the user device 100 of FIG. 1 and/or to the target UE 200 of FIG. 2.

This example embodiment relates to the target user device identifying how to trigger the activation of PRUs, based on the target user device's RRC state and/or based on the number of network nodes and PRUs detected over the Uu and SL interface, respectively.

Referring to FIG. 7, in block 701, an activation procedure is initiated for activating one or more positioning reference units for a positioning session of the apparatus, wherein the activation procedure is initiated based on at least one of the following: a radio resource control state of the apparatus, a number of detected network nodes, or a number of detected positioning reference units.

The radio resource control state of the apparatus may refer to, for example, radio resource control connected state (RRC_CONNECTED), radio resource control inactive state (RRC_INACTIVE), or radio resource control idle state (RRC_IDLE).

The activation procedure may be initiated via a small data transmission based on at least one of: the number of detected network nodes being above a first threshold value, or the number of detected positioning reference units being above a second threshold value. The activation procedure via the small data transmission may be initiated based further on the apparatus being in a radio resource control idle or inactive state.

Alternatively, the activation procedure may be initiated by transmitting an activation request to the one or more positioning reference units over sidelink based on the number of detected positioning reference units comprising at least the one or more positioning reference units.

For example, if the apparatus (target user device) detects SL reference signals from PRUs of sufficient quality, SL-based activation of PRUs may be triggered. If this is not the case, the apparatus may trigger network node based (e.g., gNB-based) PRU activation by transmitting a request to a network node (e.g., gNB) for activating the one or more positioning reference units, if the apparatus is in a radio resource control connected state (RRC_CONNECTED state). If in RRC_IDLE or RRC_INACTIVE state, the apparatus may trigger an UL small data transmission (SDT) to establish timing advance (TA) with network nodes (e.g., gNBs), if a sufficiently large number of network nodes (e.g., gNBs) is detected.

A network node may be considered as detected, if a signal metric such as RSRP measured from a signal received from the network node is above a threshold. Similarly, a positioning reference unit may be considered as detected, if a signal metric such as RSRP measured from a signal received from the positioning reference unit is above a threshold.

Figure 8:
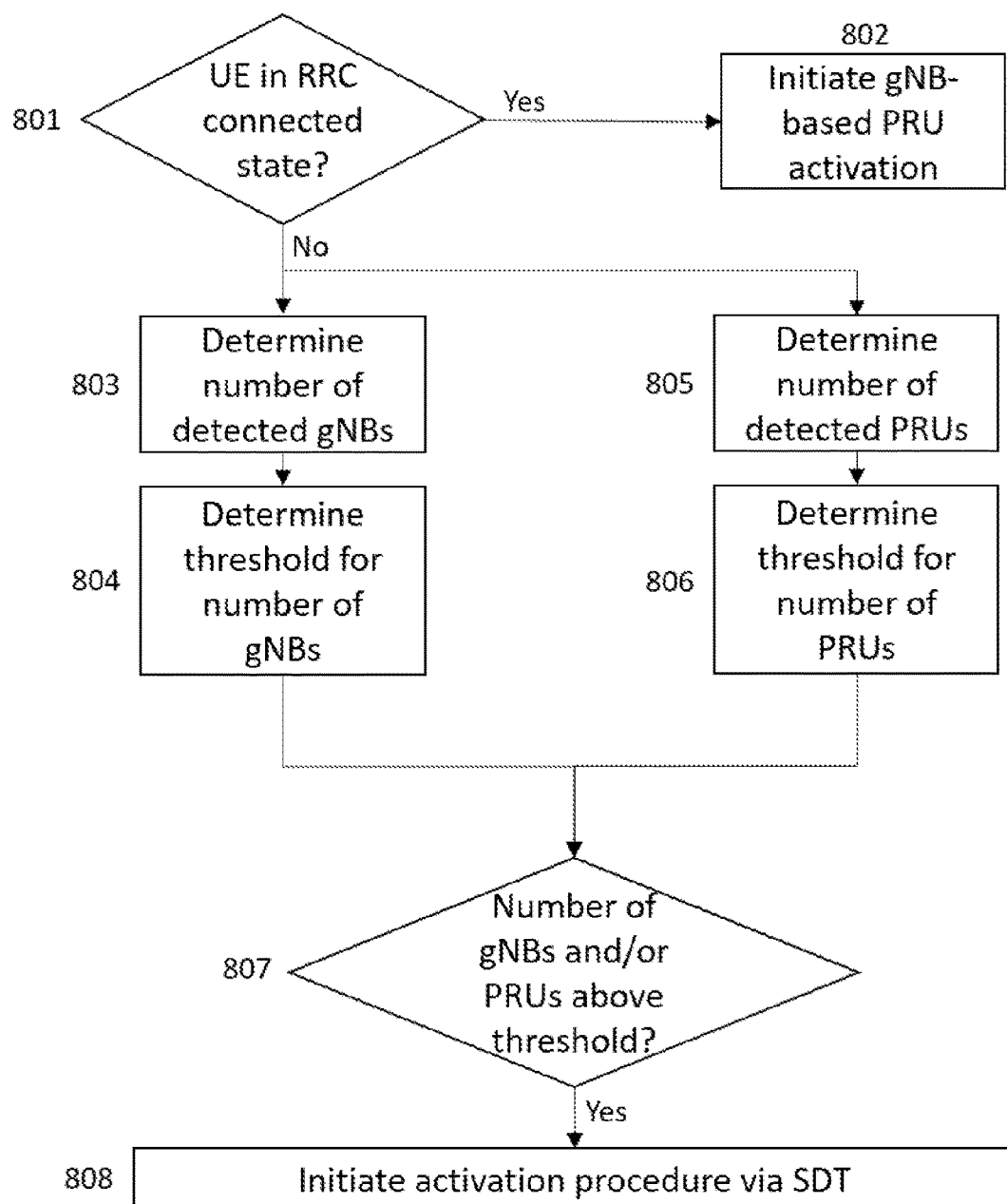
FIG. 8 illustrates a flow chart according to an example embodiment.

FIG. 8 illustrates a flow chart according to an example embodiment of a method performed by an apparatus such as, or comprising, or comprised in, a user device. The user device may also be called a subscriber unit, mobile station, remote terminal, access terminal, user terminal, terminal device, user equipment (UE), target UE or target user device. The user device may correspond to the user device 100 of FIG. 1 and/or to the target UE 200 of FIG. 2.

FIG. 8 illustrates an example of how the target user device may determine which activation procedure to initiate for block 701 of FIG. 7. In this example embodiment, the target user device may determine initiating one or more procedures for PRU activation/utilization. For example, the target user device may request its serving gNB to activate PRUs that it is serving. As another example, the PRU activation may be performed via a small data transmission (SDT) by establishing a timing advance with camped and neighboring gNBs.

When a positioning request comes to (or originates at) the target user device, it may determine which activation procedure to trigger for utilizing PRUs to improve its positioning accuracy (unless one or more of them were explicitly requested by the network), as described in the following.

Referring to FIG. 8, in block 801, the target user device checks which RRC state the target user device is in, i.e., whether the target user device is in RRC_CONNECTED, RRC_INACTIVE, or RRC_IDLE state.

In block 802, if the target user device is in RRC_CONNECTED state (block 801: yes), then the activation procedure is initiated by transmitting a request to a network node for activating the one or more positioning reference units. This may also be referred to as gNB-based PRU activation herein. In other words, in this case, the activation procedure may be initiated based on the apparatus being in a radio resource control connected state.

Alternatively, in block 803, if the target user device is not in RRC connected state (block 801: no), i.e., the target user device is in RRC_INACTIVE or RRC_IDLE state, the target user device may check whether it can detect signals from network nodes and determines the number of detected network nodes. The network nodes may be, for example, gNBs or TRPs.

A network node may be considered to be detected, if DL RSRP or another DL measurement measured from a signal received from the network node is above a threshold, wherein the threshold may be (pre)configured to the target user device by the network.

In block 804, the target user device may determine a first threshold value for the number of network nodes. The first threshold value may be calculated at the target user device based on assistance data provided by a network node (e.g., the serving gNB of the target user device), while the target user device is in RRC_CONNECTED state. The assistance data may comprise information on the PRS configuration that may be used by the target user device to determine the minimum number of network nodes (first threshold value) that should be detected in order to reach a certain desired positioning accuracy. For example, the assistance data may comprise information on at least one of the following: bandwidth of PRS, periodicity and duration of PRS, and/or positioning time occasion.

Alternatively, the first threshold value for the number of network nodes may be calculated and/or pre-configured at the network side, and provided to the target user device from the network (e.g., from its serving gNB).

In block 805, if the target user device is not in RRC connected state (block 801: no), the target user device may determine the number of detected PRUs over SL. A PRU may be considered to be detected, if SL RSRP or another SL measurement measured from a signal received from the PRU is above a threshold.

In block 806, the target user device may determine a second threshold value for the number of PRUs. The second threshold value may be calculated at the target user device based on assistance data provided by the network, while the target user device is in RRC connected state. In this case, the assistance data may comprise information on the SL PRS configuration that may be used by the target user device to determine the minimum number of positioning reference units (second threshold value) that should be detected in order to reach a certain desired positioning accuracy. For example, the assistance data may comprise information on at least one of the following: bandwidth of SL PRS, periodicity and duration of SL PRS, and/or positioning time occasion.

Alternatively, the second threshold value for the number of PRUs may be calculated and/or pre-configured at the network side, and provided to the target user device from a network node (e.g., from the serving gNB of the target user device). The second threshold value may be the same or different than the first threshold value.

Blocks 805-806 may be performed additionally or alternatively to blocks 803-804.

In block 807, the target user device checks whether the number of detected network nodes is above the first threshold value and/or whether the number of detected positioning reference units is above the second threshold value.

In block 808, if the number of detected network nodes is above the first threshold value, and/or the number of detected positioning reference units is above the second threshold value (block 807: yes), then the activation procedure is initiated via a small data transmission (SDT) to establish timing advance with the network nodes. I.e., if at least a certain number of network nodes and/or PRUs is detected, the target user device may initiate the activation procedure via UL SDT to establish timing advance with the network nodes.

In other words, the activation procedure may be initiated via a small based on at least one of the following: the number of detected network nodes being above a first threshold value, or the number of detected positioning reference units being above a second threshold value. Furthermore, the activation procedure may be initiated via the small data transmission based further on the apparatus being in a radio resource control idle or inactive state.

If the number of detected network nodes is not above the first threshold value, and the number of detected positioning reference units is not above the second threshold value, then the activation procedure may not be initiated.

SDT is a procedure allowing data transmission while remaining in RRC_INACTIVE or RRC_INACTIVE state (i.e., without transitioning to RRC_CONNECTED state). Thus, the SDT procedure may avoid the signaling overhead and delay associated with transitioning from RRC_INACTIVE or RRD_IDLE state to RRC_CONNECTED state. A UE in an inactive or idle state may initiate the small data transmission procedure, if the amount of uplink data to be transmitted is smaller than a data amount threshold.

Figure 9:
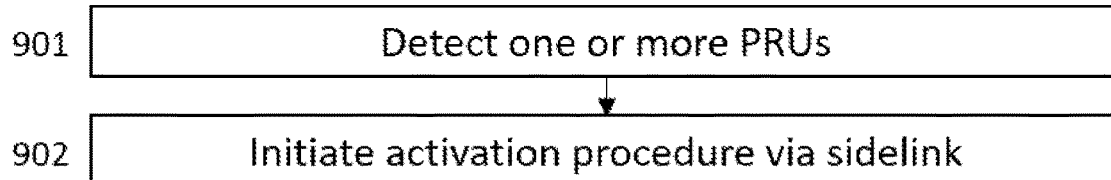
FIG. 9 illustrates a flow chart according to an example embodiment.

FIG. 9 illustrates a flow chart according to an example embodiment of a method performed by an apparatus such as, or comprising, or comprised in, a user device. The user device may also be called a subscriber unit, mobile station, remote terminal, access terminal, user terminal, terminal device, user equipment (UE), target UE or target user device. The user device may correspond to the user device 100 of FIG. 1 and/or to the target UE 200 of FIG. 2.

In this example embodiment, the target user device may check whether it can detect SL signals from other UEs (e.g., PRUs) in its proximity. If SL UEs (PRUs) are detected, the target user device may trigger SL-based activation of PRUs by broadcasting an activation request via sidelink to activate one or more PRUs within its proximity. The method of FIG. 9 may be performed in addition or alternatively to the method of FIG. 8.

Referring to FIG. 9, in block 901, one or more positioning reference units are detected. For example, the one or more positioning reference units may be detected, if a signal metric such as RSRP measured from a signal received from the one or more positioning reference units via sidelink is above a threshold.

In block 902, an activation procedure is initiated for activating the one or more positioning reference units for a positioning session of the apparatus, wherein the activation procedure is initiated by transmitting an activation request to the one or more positioning reference units over sidelink. In this case, the activation procedure may be initiated based on the number of detected positioning reference units, i.e., based on detecting the one or more positioning reference units. In other words, the number of detected positioning reference units may comprise at least the one or more positioning reference units.

In the example embodiment of FIG. 9, the apparatus may be in any RRC state, for example, RRC_CONNECTED state, RRC_INACTIVE state, or RRC_IDLE state.

Figure 10:
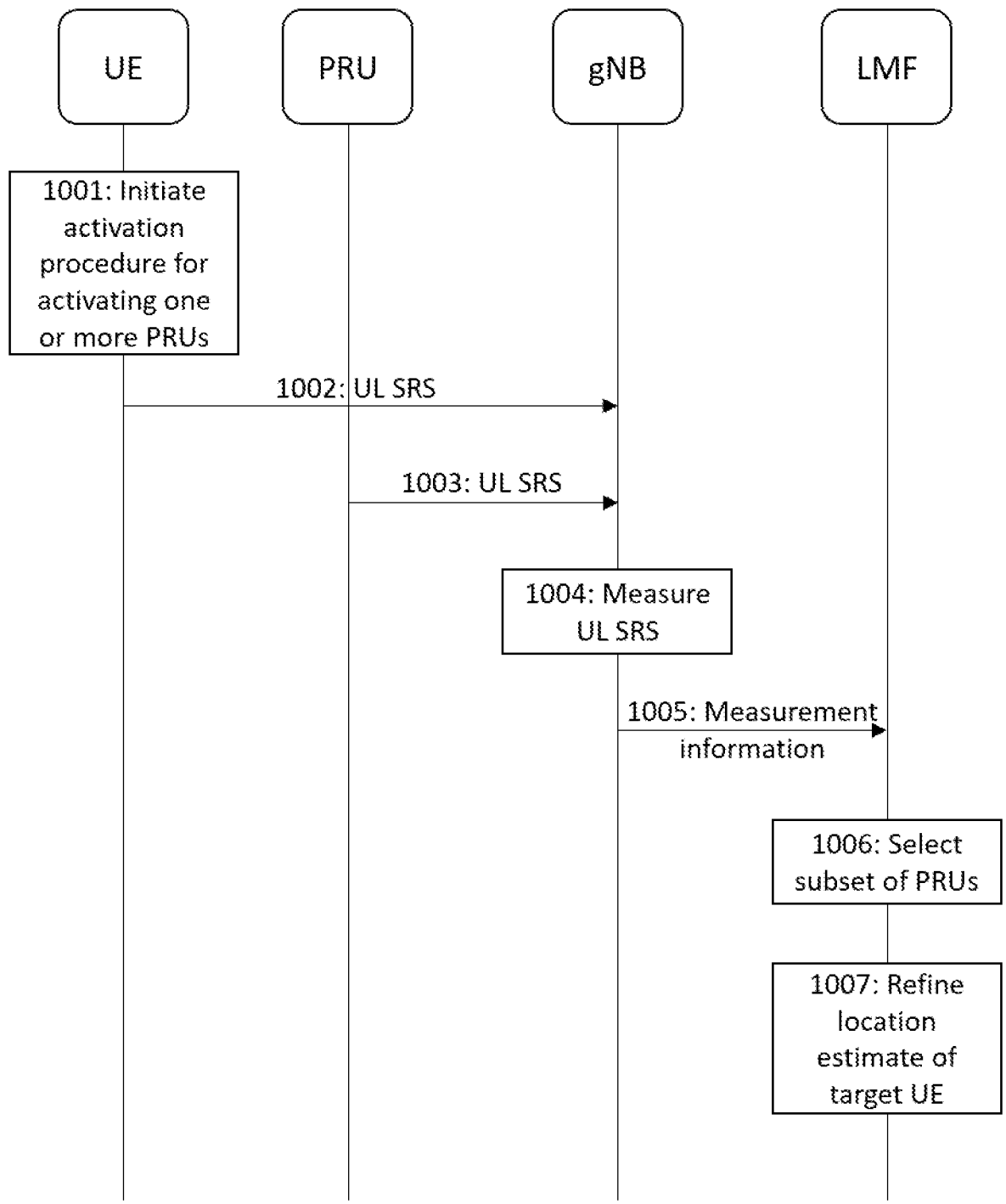
FIG. 10 illustrates a signaling diagram according to an example embodiment.

FIG. 10 illustrates a signaling diagram according to an example embodiment.

Referring to FIG. 10, in block 1001, a target user device initiates an activation procedure for activating one or more positioning reference units for a positioning session of the target user device, wherein the activation procedure is initiated based on at least one of the following: a radio resource control state of the target user device, a number of detected network nodes, and/or a number of detected positioning reference units. For example, the activation procedure may be initiated as described above with reference to any of FIGS. 7-9.

In block 1002, the target user device transmits a reference signal, for example UL SRS, to one or more first network nodes (e.g., gNBs or TRPs).

In block 1003, upon being activated, the one or more positioning reference units transmit a reference signal, for example UL SRS, to one or more second network nodes (e.g., gNBs or TRPs). At least some of the one or more second network nodes may be the same as the one or more first network nodes.

In block 1004, the one or more first network nodes measure the reference signal transmitted from the target user device, and the one or more second network nodes measure the reference signal transmitted from the one or more positioning reference units.

In block 1005, the one or more second network nodes report, to a location management function, a first set of measurement information associated with the reference signal transmitted from a set of positioning reference units, wherein the set of positioning reference units comprises at least the one or more positioning reference units activated for the positioning session of the target user device.

Furthermore, the one or more first network nodes report, to the location management function, a second set of measurement information associated with the reference signal transmitted from the target user device.

In block 1006, the location management function selects a subset of positioning reference units from the set of positioning reference units, wherein the selection is based at least on determining that the reference signal transmitted per positioning reference unit of the subset of positioning reference units is measured (or was measured) by a same set of network nodes that measured the reference signal transmitted from the target user device. For example, the subset of positioning reference units may be selected as described above with reference to any of FIGS. 3-6.

In block 1007, the location management function refines a location estimate of the target user device based at least on a subset of measurement information from the first set of measurement information, wherein the subset of measurement information is associated with the selected subset of positioning reference units.

The blocks, related functions, and information exchanges (messages) described above by means of FIGS. 3-10 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 11:
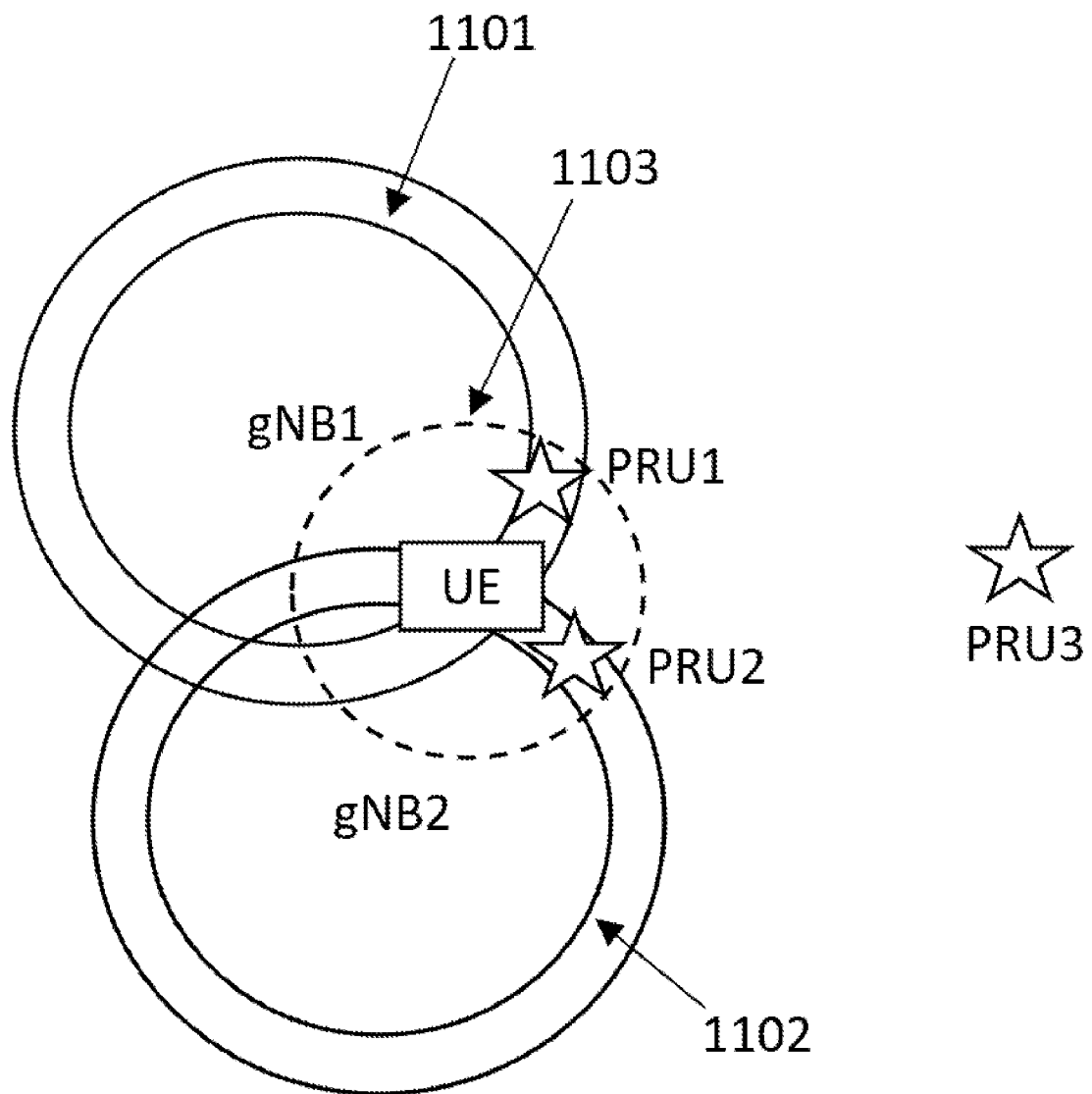
FIG. 11 illustrates an example scenario.

FIG. 11 illustrates an example scenario of the situation of gNBs, PRUs, and the target user device. In a multi-PRU scenario, the LMF can also select multiple PRUs with the purpose of correcting measurements, where a given PRU may be associated with a different positioning measurement belonging to a different anchor node, e.g., gNB. In general, for a given TRP, a different PRU may be selected, if it is in better conditions for differential measurements compared to other PRU candidates.

For example, in FIG. 11, the distance between the target user device and PRU1 with respect to gNB1 is approximately the same, as visualized by the disc 1101. However, from the perspective of gNB2, PRU1 is not in approximately the same distance as the target user device. As visualized by the disc 1102, PRU2 is more suitable to be associated with correcting the measurements that involve gNB2. On the other hand, PRU3 is not co-located with the target user device at all, and the TAs from gNB1 and gNB2 would be substantially different from those for the target user device and the PRU 3.

The LMF may improve the quality of the differential PRU measurements by associating measurements from PRU1 with the measurements obtained using the TRP of gNB1, and associating PRU2 with the measurements obtained using the TRP of gNB2.

It should be noted that similarity of timing advance from a single gNB may not be satisfactory condition for PRU selection by itself. The PRU should also be located in the vicinity of the target user device itself, as visualized in FIG. 11 by the circle 1103 indicating the maximum permissible range from the target user device, to avoid cases where the target user device and the PRU share similar TA (i.e., they both lie on either disc 1101 or disc 1102 in FIG. 11) but are not co-located (e.g., they are located in opposite halves of the disc).

Figure 12:
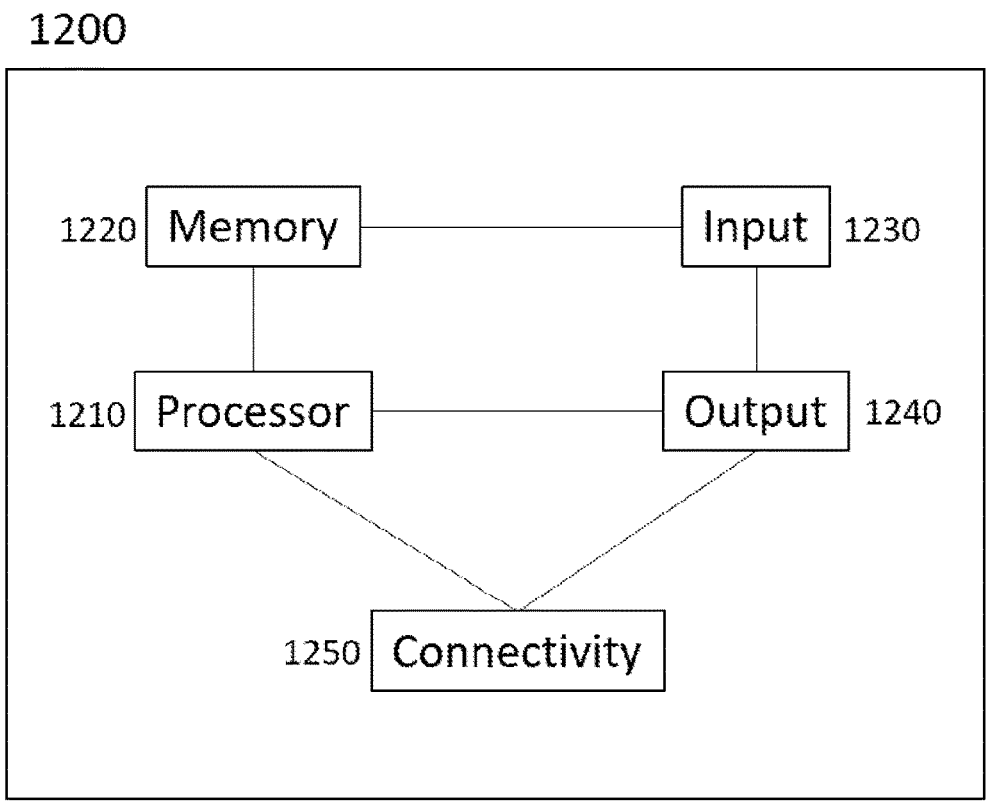
FIG. 12 illustrates an example of an apparatus.

FIG. 12 illustrates an example of an apparatus 1200 comprising means for performing any of the methods of FIGS. 7-9, or any other example embodiment described above. For example, the apparatus 1200 may be an apparatus such as, or comprising, or comprised in, a user device. The apparatus 1200 may correspond to the user device 100 of FIG. 1 and/or to the target UE 200 of FIG. 2. The apparatus 1200 may also be called a subscriber unit, mobile station, remote terminal, access terminal, user terminal, terminal device, user equipment (UE), target UE, or target user device.

The apparatus 1200 comprises at least one processor 1210. The at least one processor 1210 interprets computer program instructions and processes data. The at least one processor 1210 may comprise one or more programmable processors. The at least one processor 1210 may comprise programmable hardware with embedded firmware and may, alternatively or additionally, comprise one or more application-specific integrated circuits (ASICs).

The at least one processor 1210 is coupled to at least one memory 1220. The at least one processor is configured to read and write data to and from the at least one memory 1220. The at least one memory 1220 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 1220 stores computer readable instructions that are executed by the at least one processor 1210 to perform one or more of the example embodiments described above. For example, non-volatile memory stores the computer readable instructions, and the at least one processor 1210 executes the instructions using volatile memory for temporary storage of data and/or instructions. The computer readable instructions may refer to computer program code.

The computer readable instructions may have been pre-stored to the at least one memory 1220 or, alternatively or additionally, they may be received, by the apparatus, via an electromagnetic carrier signal and/or may be copied from a physical entity such as a computer program product. Execution of the computer readable instructions by the at least one processor 1210 causes the apparatus 1200 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
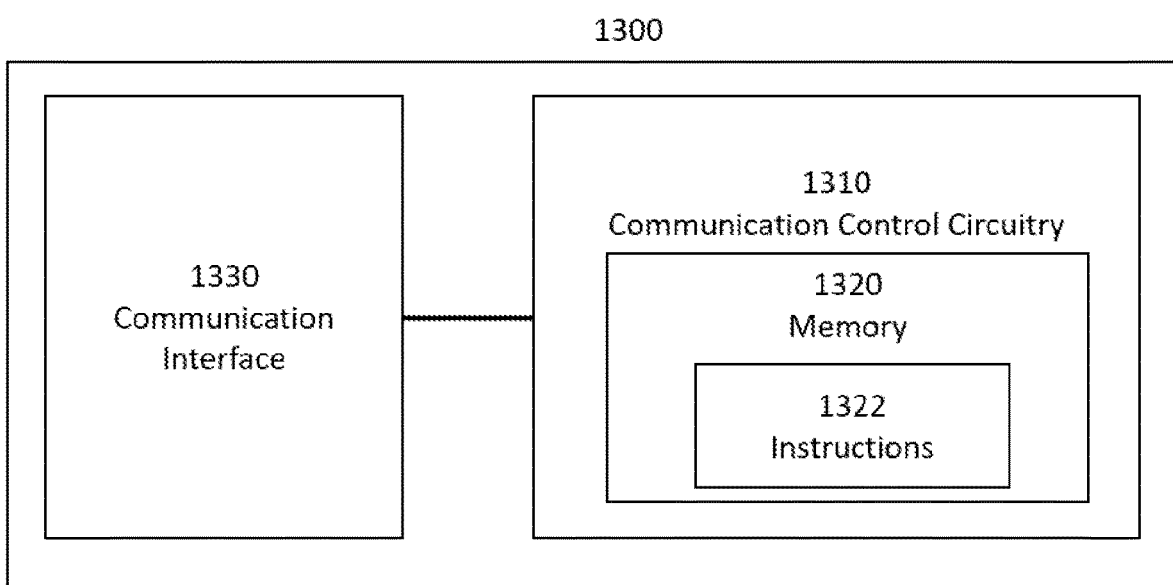
FIG. 13 illustrates an example of an apparatus.

FIG. 13 illustrates an example of an apparatus 1300 comprising means for performing any of the methods of FIGS. 3-6 or any other example embodiment described above. For example, the apparatus 1300 may be an apparatus such as, or comprising, or comprised in, a network element of a core network. For example, the network element may correspond to the LMF 112, 212. The network element may also be referred to, for example, as a core network entity or a location server.

The apparatus 1300 may comprise, for example, a circuitry or a chipset applicable for realizing one or more of the example embodiments described above. The apparatus 1300 may be an electronic device comprising one or more electronic circuitries. The apparatus 1300 may comprise a communication control circuitry 1310 such as at least one processor, and at least one memory 1320 storing instructions 1322 which, when executed by the at least one processor, cause the apparatus 1300 to carry out one or more of the example embodiments described above. Such instructions 1322 may, for example, include a computer program code (software) wherein the at least one memory and the computer program code (software) are configured, with the at least one processor, to cause the apparatus 1300 to carry out one or more of the example embodiments described above. The at least one processor and the at least one memory storing the instructions may provide the means for providing or causing the performance of any of the methods and/or blocks described above.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1330 provides the apparatus with radio communication capabilities to communicate in the cellular communication system. The communication interface may, for example, provide a radio interface to one or more user devices. The apparatus 1300 may further comprise another interface towards a core network entity such as the network coordinator apparatus or AMF, and/or to the access nodes of the cellular communication system.

It is to be noted that the apparatus 1300 may further comprise various components not illustrated in FIG. 13. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus comprising at least one processor, and at least one memory storing instructions which, when executed by the at least one processor, cause the apparatus at least to:
   initiate an activation procedure for activating one or more positioning reference units for a positioning session of the apparatus;
   wherein the activation procedure is initiated via a small data transmission based on at least one of: a number of detected network nodes being above a first threshold value, or a number of detected positioning reference units being above a second threshold value; or
   wherein the activation procedure is initiated by transmitting an activation request to the one or more positioning reference units over sidelink based on the number of detected positioning reference units comprising at least the one or more positioning reference units.

2. The apparatus according to claim 1, wherein the activation procedure via the small data transmission is initiated based further on the apparatus being in a radio resource control idle or inactive state.

3. The apparatus according to claim 1, further being caused to:
   receive, from a network node, information indicating at least one of: the first threshold value or the second threshold value.

4. The apparatus according to claim 1, further being caused to:
   determine the first threshold value based on assistance data received from a network node, wherein the assistance data comprises information on a positioning reference signal configuration,
   wherein the first threshold value indicates a minimum number of network nodes that should be detected to reach a desired positioning accuracy.

5. The apparatus according to claim 1, further being caused to:
   determine the second threshold value based on assistance data received from a network node, wherein the assistance data comprises information on a sidelink positioning reference signal configuration,
   wherein the second threshold value indicates a minimum number of positioning reference units that should be detected to reach a desired positioning accuracy.

6. The apparatus according to claim 1, further being caused to:
   transmit, to a network node, a request for activating the one or more positioning reference units, wherein the request is transmitted based on the apparatus being in a radio resource control connected state.

7. The apparatus according to claim 1, wherein the apparatus comprises, or is comprised in, a user device.

8. A method comprising:
   initiating, by an apparatus, an activation procedure for activating one or more positioning reference units for a positioning session of the apparatus;
   wherein the activation procedure is initiated via a small data transmission based on at least one of: a number of detected network nodes being above a first threshold value, or a number of detected positioning reference units being above a second threshold value; or
   wherein the activation procedure is initiated by transmitting an activation request to the one or more positioning reference units over sidelink based on the number of detected positioning reference units comprising at least the one or more positioning reference units.

9. The method according to claim 8, wherein the activation procedure via the small data transmission is initiated based further on the apparatus being in a radio resource control idle or inactive state.

10. The method according to claim 8, further comprising:
    receiving, by the apparatus, from a network node, information indicating at least one of: the first threshold value or the second threshold value.

11. The method according to claim 8, further comprising:
    determining, by the apparatus, the first threshold value based on assistance data received from a network node, wherein the assistance data comprises information on a positioning reference signal configuration,
    wherein the first threshold value indicates a minimum number of network nodes that should be detected to reach a desired positioning accuracy.

12. The method according to claim 8, further comprising:
    determining, by the apparatus, the second threshold value based on assistance data received from a network node, wherein the assistance data comprises information on a sidelink positioning reference signal configuration,
    wherein the second threshold value indicates a minimum number of positioning reference units that should be detected to reach a desired positioning accuracy.

13. The method according to claim 8, further comprising:
    transmitting, by the apparatus, to a network node, a request for activating the one or more positioning reference units, wherein the request is transmitted based on the apparatus being in a radio resource control connected state.

14. A non-transitory computer readable medium comprising program instructions which, when executed by an apparatus, cause the apparatus to perform at least the following:
    initiating an activation procedure for activating one or more positioning reference units for a positioning session of the apparatus;
    wherein the activation procedure is initiated via a small data transmission based on at least one of: a number of detected network nodes being above a first threshold value, or a number of detected positioning reference units being above a second threshold value; or
    wherein the activation procedure is initiated by transmitting an activation request to the one or more positioning reference units over sidelink based on the number of detected positioning reference units comprising at least the one or more positioning reference units.

15. A system comprising at least a location management function and a user device;
wherein the user device is configured to:
initiate an activation procedure for activating one or more positioning reference units for a positioning session of the user device;
wherein the activation procedure is initiated via a small data transmission based on at least one of: a number of detected network nodes being above a first threshold value, or a number of detected positioning reference units being above a second threshold value; or
wherein the activation procedure is initiated by transmitting an activation request to the one or more positioning reference units over sidelink based on the number of detected positioning reference units comprising at least the one or more positioning reference units;
wherein the location management function is configured to:
obtain a first set of measurement information associated with a reference signal transmitted from a set of positioning reference units, wherein the set of positioning reference units comprises at least the one or more positioning reference units activated for the positioning session of the user device;
select a subset of positioning reference units from the set of positioning reference units, wherein the selection is based at least on determining that the reference signal transmitted per positioning reference unit of the subset of positioning reference units is measured by a same set of network nodes that measured a reference signal transmitted from the user device; and
refine a location estimate of the user device based at least on a subset of measurement information from the first set of measurement information, wherein the subset of measurement information is associated with the subset of positioning reference units.

\* \* \* \* \*